United States Patent
Spell

[19]

[11] Patent Number: 5,819,639

[45] Date of Patent: Oct. 13, 1998

[54] ROTISSERIE APPARATUS

[76] Inventor: Barry L. Spell, 218 E. Magnolia St., Crowley, La. 70526

[21] Appl. No.: 991,164

[22] Filed: Dec. 16, 1997

[51] Int. Cl.[6] .............................. A47J 37/00; A47J 37/04
[52] U.S. Cl. ............................. 99/421 H; 99/419; 99/446
[58] Field of Search ............... 99/339, 340, 419–421 V, 99/400, 401, 444–446; 126/25 R, 9 R, 41 R

[56] References Cited

U.S. PATENT DOCUMENTS

| | | | |
|---|---|---|---|
| 77,349 | 4/1868 | Bigelow | 99/421 H |
| 472,595 | 4/1892 | Wachs | 99/421 H |
| 652,660 | 6/1900 | Bradlee | 99/421 H |
| 1,741,400 | 12/1929 | Bocchino | 99/421 H |
| 2,580,549 | 1/1952 | Jacobson | 99/421 H |
| 2,811,099 | 10/1957 | McGoldrick | 99/421 H |
| 2,821,905 | 2/1958 | Culligan | 99/421 H |
| 2,885,951 | 5/1959 | Wolske | 99/421 H |
| 3,008,406 | 11/1961 | Reeves et al. | 99/421 H |
| 3,633,491 | 1/1972 | Williams, Jr. et al. | 99/340 |
| 3,802,330 | 4/1974 | Graziani | 99/419 |
| 3,866,527 | 2/1975 | Katris | 99/421 H |
| 4,078,478 | 3/1978 | Geisel | 99/421 P |
| 4,750,414 | 6/1988 | Dohrs | 99/419 |
| 4,896,253 | 1/1990 | Southworth | 99/421 H |
| 4,979,439 | 12/1990 | Ferron-Zepeda | 99/421 R |
| 5,471,915 | 12/1995 | Lopata | 99/421 H |

*Primary Examiner*—Timothy F. Simone
*Attorney, Agent, or Firm*—David L. Volk

[57] ABSTRACT

A base includes a bottom panel and four generally upwardly extended side walls. A first support and a second support are each configured to extend upwardly from the base. A spit is configured to extend between and to be supported by the first and the second supports, above and along the base. A rotation apparatus for rotating the spit includes a spit holding mechanism for fixedly holding an end of the spit, and a manually wound spring mechanism configured to rotate the spit holding mechanism. The first support and the second support are each formed of a bent rod, having a pair of opposed legs which extend downwardly from a spit supporting portion toward opposing ones of the side walls. Distal ends of the legs are outwardly turned and penetrate the side walls, so that the first support and the second support are each pivotal inwardly and downwardly toward the base from an upwardly extended position. The legs are urged into recesses in the side walls, thus locking the first and second supports in the upright position.

5 Claims, 3 Drawing Sheets

ROTISSERIE APPARATUS

BACKGROUND OF THE INVENTION

1. Field Of The Invention

The present invention relates to rotisseries.

2. Description Of The Related Art

Rotisserie cooked food has become increasingly popular. Part of the popularity is due to the fact that fat drips off of rotisserie cooked food, making it more healthful. Another reason for the popularity is the evenly cooked food that results from rotisserie use.

Because of the special equipment required, rotisserie food is normally enjoyed in restaurants and at back yard barbeques. What is needed is an apparatus which will provide rotisserie cooked food in a conventional home oven.

SUMMARY OF THE INVENTION

The rotisserie apparatus of the present invention includes a base having a bottom panel and four generally upwardly extended side walls. A first support and a second support are each configured to extend upwardly from the base. A spit is configured to extend between and to be supported by the first and the second supports, above and along the base.

A rotation apparatus for rotating the spit includes a spit holding mechanism for fixedly holding an end of the spit, and a manually wound spring mechanism configured to rotate the spit holding mechanism.

The first support and the second support are each formed of a bent rod, having a pair of opposed legs which extend downwardly from a spit supporting portion toward opposing ones of the side walls. Distal ends of the legs are outwardly turned and penetrate the side walls, so that the first support and the second support are each pivotal inwardly and downwardly toward the base from an upwardly extended position. The legs are urged into recesses in the side walls, thus locking the first and second supports in the upright position.

The first and second supports are removable from the base for cleaning, by urging the legs toward each other until the distal ends are freed from the side walls.

Because the legs are pivotal, the rotisserie apparatus is easily, conveniently and compactly stored away after cleaning.

The base catches drippings from a food item on the spit, and is adapted to be placed on a rack in a conventional oven.

Because the rotation apparatus comprises a manually wound spring mechanism, no high temperature resistant motors or batteries are required, and no AC power source is required.

Still further features and advantages will become apparent from the ensuing description and drawings.

DETAILED DESCRIPTION

Figure 1:
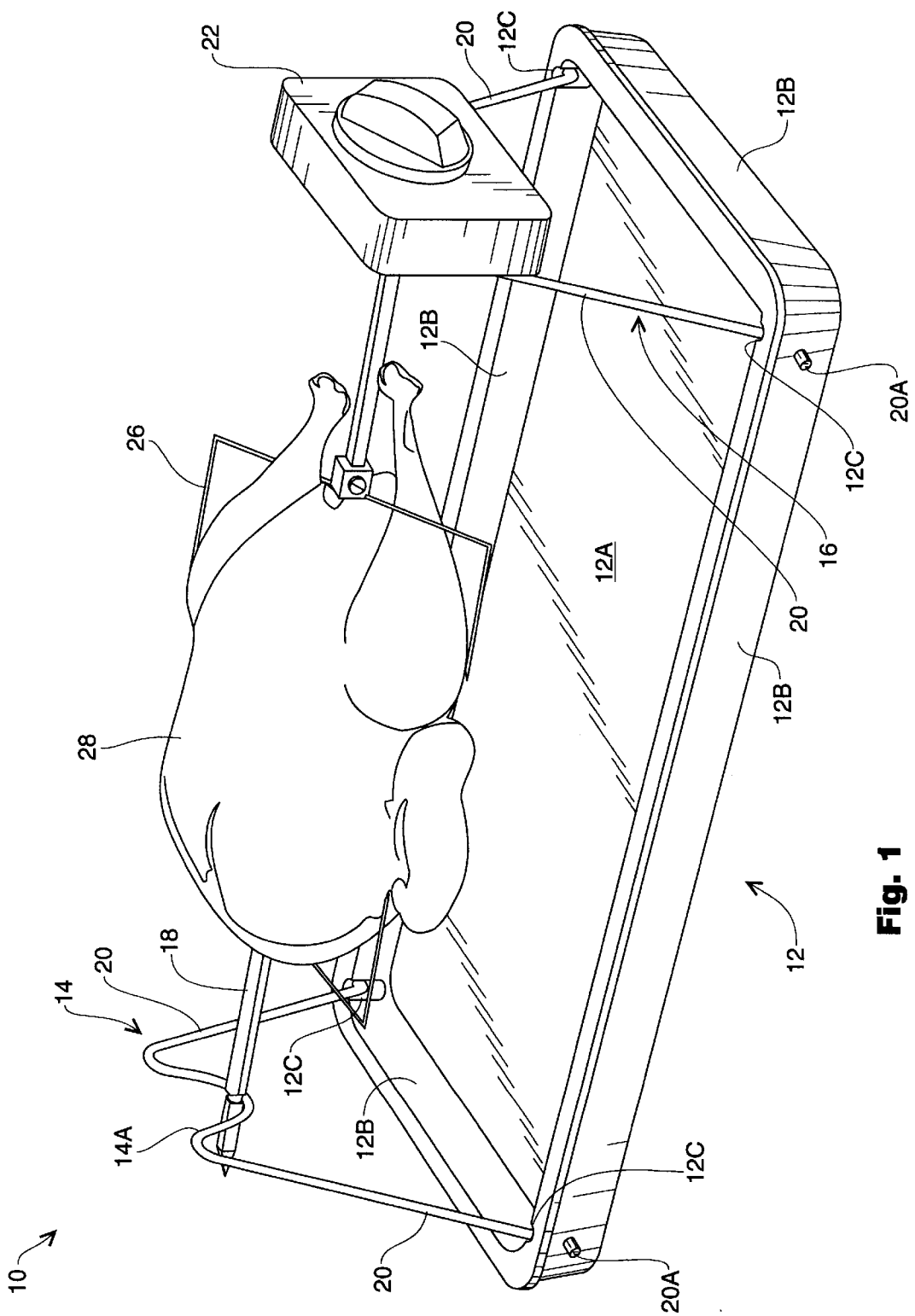
FIG. 1 is a perspective view of a rotisserie apparatus of the present invention.
Figure 2:
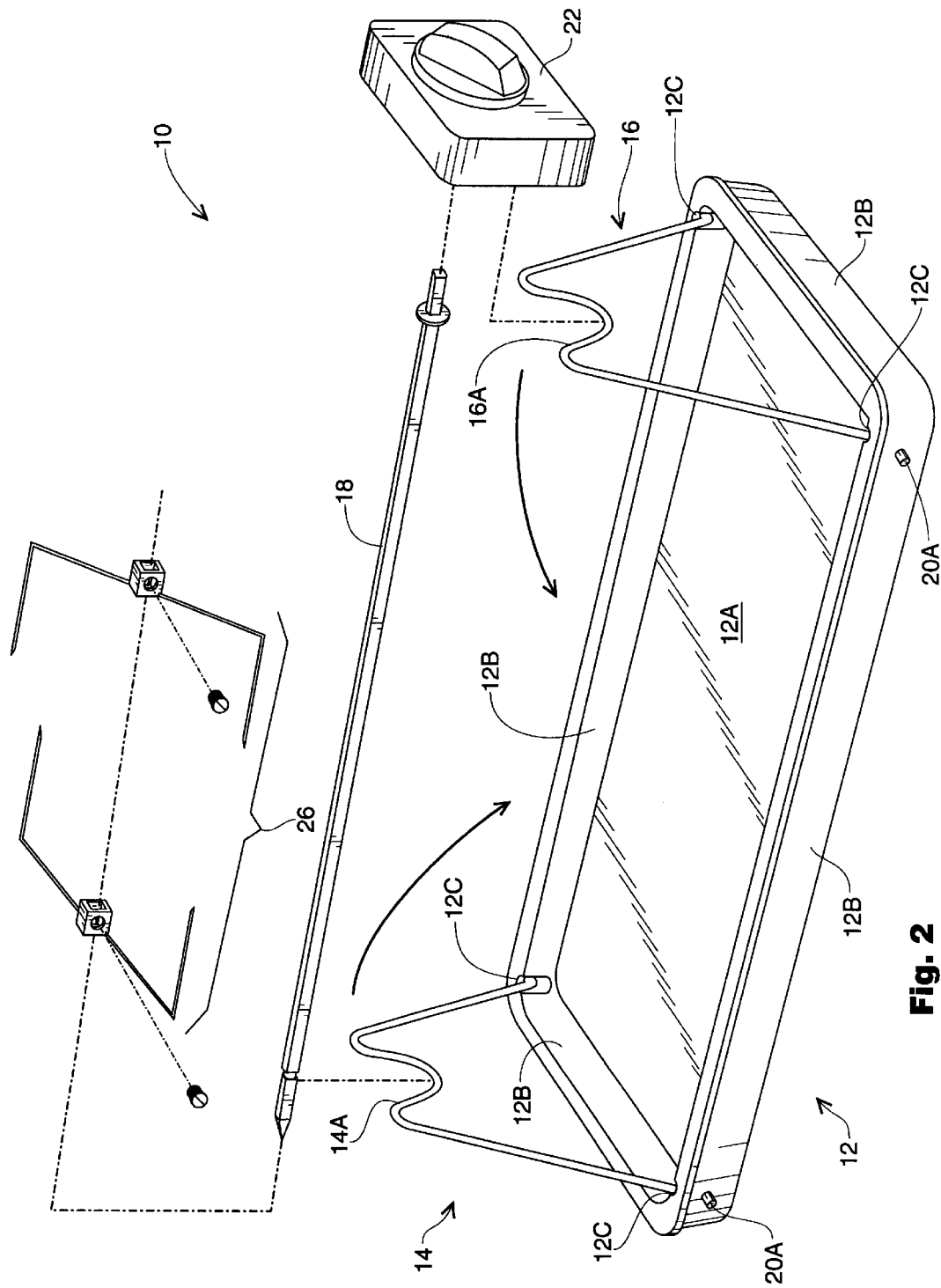
FIG. 2 is an exploded perspective view of the rotisserie apparatus.

FIG. 1 is a perspective view of a rotisserie apparatus 10 of the present invention, and FIG. 2 is an exploded perspective view thereof. Referring to FIGS. 1 and 2, the rotisserie apparatus 10 includes a base 12 having a bottom panel 12A and four generally upwardly extended side walls 12B.

A first support 14 and a second support 16 are each configured to extend upwardly from the base 12. A spit 18 is configured to extend between and to be supported by the first and the second supports 14, 16, above and along the base 12. The spit 18 is adapted to skewer a food item 28. A conventional food holding means 26 is attachable to the spit 18 for maintaining the food item 28 in position on the spit 18.

The first support 14 and the second support 16 are each formed of a bent rod, having a pair of opposed legs 20 which extend downwardly from a spit supporting portion 14A, 16A toward opposing ones of the side walls 12B. Distal ends 20A of the legs 20 are outwardly turned and penetrate the side walls 12B, so that the first support 14 and the second support 16 are each pivotal inwardly and downwardly toward the base 12, from an upwardly extended position as shown by the arrows in FIG. 2.

The rotisserie apparatus 10 further comprises recesses 12C in the side walls 12B. The first and second supports 14, 16 are configured such that the legs 20 are springedly urged into the recesses 12C when the first and second supports 14, 16 are in the upwardly extended position, thereby locking the first and second supports 14, 16 in the upwardly extended position.

The first and second supports 14, 16 are removable from the base 12 for cleaning, by urging the legs 20 toward each other until the distal ends 20A are freed from the side walls 12B.

Figure 3:
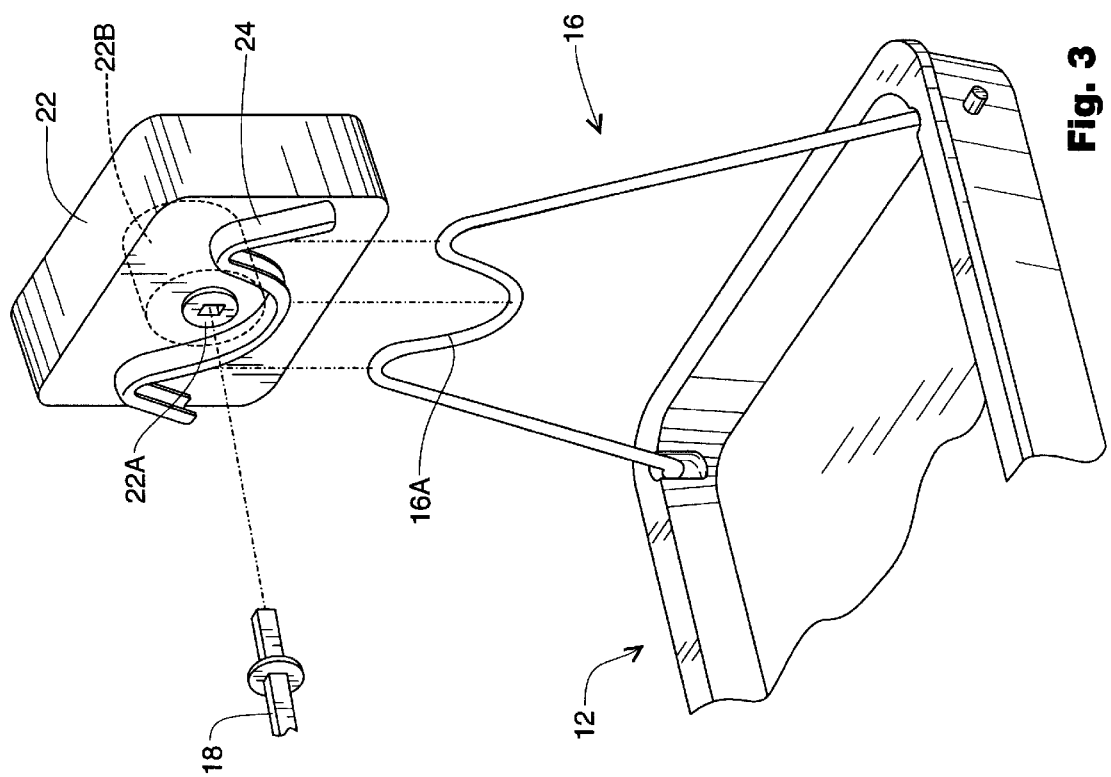
FIG. 3 is a partial enlarged exploded perspective view of the rotisserie apparatus, showing a rotation apparatus for rotating a spit.

FIG. 3 is a partial enlarged exploded perspective view of the rotisserie apparatus 10, showing a rotation apparatus 22 for rotating the spit 18. The rotation apparatus 22 includes a spit holding mechanism 22A for fixedly holding an end of the spit 18, and a manually wound spring mechanism 22B configured to rotate the spit holding mechanism 22A. The rotation apparatus 22 includes an arcuate support 24 configured to retain the rotation apparatus 22 on the spit supporting portion 16A of the second support 16. Other means for supporting the rotation apparatus 22 in proper relationship to the second support 16 are within the scope of the present invention.

Because manually wound spring mechanisms are generally known in the art, no further details are required for one skilled in the art to build and use the present invention.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

It is claimed:

1. A rotisserie apparatus comprising:
   a. a base adapted to catch drippings from food cooked above the base;
   b. a first support and a second support, each of the first and second supports configured to extend upwardly from the base when the apparatus is positioned upright and ready for use;
   c. the first support and the second support each configured to pivot inwardly and downwardly toward the base from an upwardly extended position;

d. a spit configured to extend between and to be supported by the first and the second supports, above and along at least a portion of the base when the apparatus is positioned upright and ready for use;

e. the spit adapted to skewer a food item;

f. food holding means adapted to maintain the food item in position on the spit; and g. a rotation means for rotating the spit about a longitudinal axis of the spit.

2. A rotisserie apparatus comprising:

a. a base adapted to catch drippings from food cooked above the base;

b. the base including a bottom panel and four generally upwardly extended side walls when the apparatus is positioned upright and ready for use;

c. a first support and a second support, each of the first and second supports configured to extend upwardly from the base when the apparatus is positioned upright and ready for use;

d. a spit configured to extend between and to be supported by the first and the second supports, above and along at least a portion of the base when the apparatus is positioned upright and ready for use;

e. the spit adapted to skewer a food item;

f. food holding means adapted to maintain the food item in position on the spit;

g. a rotation means for rotating the spit about a longitudinal axis of the spit; and h. the first support and the second support each being formed of a bent rod, having a pair of opposed legs which extend downwardly from a spit supporting portion toward opposing ones of the side walls when the first and the second supports are extended upwardly from the base and ready for use, distal ends of the legs being outwardly turned and penetrating the side walls, the first support and the second support each being pivotal about the distal ends of the legs thereof inwardly and downwardly toward the base from an upwardly extended position.

3. The rotisserie apparatus of claim 2, wherein the first support and the second support are each removable from the base by urging the opposed legs toward each other until the legs are freed from the side walls.

4. The rotisserie apparatus of claim 2, further comprising recesses in the side walls, the legs being urged into the recesses when the first and second supports are in the upwardly extended position, thereby locking the first and second supports in the upwardly extended position.

5. A rotisserie apparatus comprising:

a. a base adapted to catch drippings from food cooked above the base;

b. a first support and a second support, each of the first and second supports configured to extend upwardly from the base when the apparatus is positioned upright and ready for use;

C. each of the first and second supports forming a generally M-shaped spit supporting portion at a distal end of thereof;

d. a rotation means having a generally M-shaped support configured to mate with the spit supporting portion of the second support to secure the rotation means to the second support;

e. a spit configured to extend from the rotation means to the spit supporting portion of the second support, above and along at least a portion of the base when the apparatus is positioned upright and ready for use;

f. the spit adapted to skewer a food item; and g. the rotation means configured to rotate the spit about a longitudinal axis of the spit.

* * * * *